Oct. 28, 1969   T. B. DELLINGER ET AL   3,474,866
METHOD OF AND MEANS FOR SEALING CASING STRINGS
Filed Oct. 23, 1965   2 Sheets-Sheet 1

INVENTORS:
THOMAS B. DELLINGER
JAMES H. COBBS

BY *Head & Johnson*

ATTORNEYS

Oct. 28, 1969   T. B. DELLINGER ET AL   3,474,866
METHOD OF AND MEANS FOR SEALING CASING STRINGS
Filed Oct. 23, 1965   2 Sheets-Sheet 2

INVENTORS:
THOMAS B. DELLINGER
JAMES H. COBBS

BY *Head & Johnson*
ATTORNEYS

United States Patent Office

3,474,866
Patented Oct. 28, 1969

3,474,866
METHOD OF AND MEANS FOR SEALING CASING STRINGS
Thomas B. Dellinger and James H. Cobbs, Tulsa, Okla., assignors to Fenix & Scisson, Inc., Tulsa, Okla., a corporation of Oklahoma
Filed Oct. 23, 1965, Ser. No. 504,012
Int. Cl. E21b 33/13, 33/14, 33/12
U.S. Cl. 166—289                                             7 Claims

ABSTRACT OF THE DISCLOSURE

This invention may be generally described as a method of a sealing a casing in an earth bore hole. More particularly, the invention relates to a method of sealing a casing in an earth bore hole comprising the steps of positioning a first circumferential stratum of cement in the annulus between the exterior of the casing and the bore hole, positioning a circumferential stratum of liquid sealing compound in the annulus above the first cement stratum and positioning a second circumferential stratum of cement above the stratum of liquid sealing compound. A further embodiment of the invention includes means provided for maintaining the pressure of the liquid stratum.

---

This invention relates to a method of sealing casing strings. More particularly, the invention relates to a method of sealing casing strings passing through liquid bearing formations to prevent liquid from such formations from passing by way of the bore hole into caverns or the like with which the bore hole communicates.

It is the normal practice in supporting casings in bore holes to seal the bore holes with cement. In most installations, particularly in the petroleum industry where relatively small diameter casings are utilized, this type of sealing is usually completely effective. However, when large diameter casings are installed, such as to provide access to lower subterranean caverns, such as mines, underground storage reservoirs and so forth, the sealing problem is much more difficult. This is especially true if a casing must be sealed in a salt formation since any small flow of water will soon dissolve out a larger flow path and ultimately result in complete failure of the seal.

This invention provides a means to overcome the aforesaid problems and provides in the annular space of casing in a bore hole, spaced stratum of cement between which a dissimilar liquid is positioned to act as a seal against leakage from undesired fluids that may exist above. Means is provided to miantain the liquid and/or its pressure.

It is therefore an object of this invention to provide an improved method of sealing casing string.

More particularly, it is an object of this invention to provide an improved method of sealing casing strings wherein the sealing pressure can be continuously maintained and the seal medium replenished as required.

These basic objects and others will be understood by referring to the following description and claims taken in conjunction with the attached drawings in which:

Figure 1:
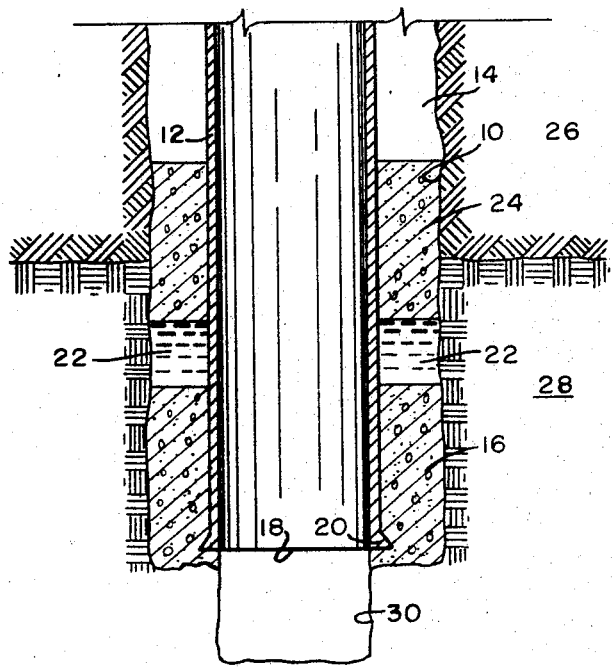
FIGURE 1 is a cross-sectional view of the lower portion of a bore hole in the earth into which a casing is supported and showing the improved method of sealing of this invention.

Referring now to the drawings, and first to FIGURE 1, a bore hole 10 is shown in the earth in which a casing 12 is positioned, the casing extending to the surface of the earth. The normal means of sealing the casing 12 in the bore hole 10 is to fill the annulus 14 between the casing and bore hole with cement, usually starting at the bottom of the bore hole and casing and extending as far up the hole as necessary, and in many instances the entire annulus is filled from the bottom to the surface. While, as previously indicated, such sealing means is successful in many instances, particularly for small diameter casing, it is not completely successful where large diameter casing is required.

In the method of this invention a first stratum of cement 16 is positioned in the annulus 14. This first stratum 16 may be, as shown, at the lower end 18 of the casing 14. The casing may include a terminal flange ring 20 as shown to improve the support of the casing within the first stratum of cement 16.

After the first stratum of cement 16 is in place a stratum of liquid sealing compound 22 is positioned in the annulus 14 above the first cement stratum 16. The composition of the liquid sealing compound 22 will be described subsequently.

The third step is the positioning of the second stratum of cement 24 above the strata of liquid sealing compound 22. Thus, the first and second strata of cement 16 and 24 form lower and upper boundaries for the stratum of liquid sealing compound 22.

As shown in FIGURE 1 the casing 12 passes through an upper liquid bearing formation 26 and into a dry formation 28. It is imperative in many type of underground work, such as providing mining shafts, shafts communicating with underground storage, and so forth, that none of the liquid, usually in the form of water, from the liquid bearing formation 26 passes through the annulus 14 into the lower portion of the bore hole. If the impervious formation 28 is of a dissolvable material, such as salt, any slight leakage along the annulus 14 will soon dissolve out a larger leakage channel and the flow is thereby multiplied so that it is imperative to seal the casing 12 completely. Expansion and contraction of cement in the strata 16 and 24 in many instances permit small leakage so that the use of cement alone has found to be inadequate.

After the casing 12 has been sealed as shown, the open hole 30 may be continued in the impervious formation 28 and no fluid will flow into the open hole 30 from the upper liquid bearing formation 26.

The liquid sealing compound 22, which may also be termed a chemical seal or chemical packer, must be of a material having properties which will plug small voids, which will plate out on permeable formations, which will flow with pressure, which is flexible, which will not deteriorate in its physical properties, and which will not react with cement, the earth formation in which it is positioned, or with the material of which the casing 12 is made. Examples of such liquid sealing compounds which meet the above required characteristics are drilling muds, either oil or water base, hydrocarbons, gelled hydrocarbons, thickened hydrocarbons, hydrocarbons-water emulsions, gelled water, thickened water, plastic polymers, hydrocarbons and bentonite compounds, guar gums and hydrocarbon compounds, and various other viscous chemical compounds.

In the arrangement of FIGURE 1 the liquid sealing compound 22 will continue to provide a leakproof chemical seal of the casing 12 unless the quantity of the sealing compound is diminished, such as by a portion thereof passing into the formation 28. An important part of this invention is the provision of means of maintaining the pressure of the liquid sealing compound 22 and at the same time augmenting the quantity of the sealing compound as required. One method of accomplishing this is the use of a liquid sealing compound 22 which is self-regenerative, that is, which expands when contacted by water. Such liquid sealing compounds which have a characteristic of expanding when contacted by water, and which still retains the desirable physical properties above described, include compounds of hydrocarbons and powdered bentonite, polysaccharide polymers, hydrocarbons and carboxymethylcellulose compounds, hydrocarbons and starch flour compounds, hydrocarbons and guar gum flour compounds and others which will be suggested to those skilled in the art. By the use of such self-regenerative liquid sealing compound, any reduction in the volume or pressure of the liquid sealing compound 22 which permits water flow along the annulus into the area of the liquid sealing compound results in an immediate and automatic increase in the volume and thereby the pressure of the sealing compound to maintain the sealing effectiveness.

Figure 2:
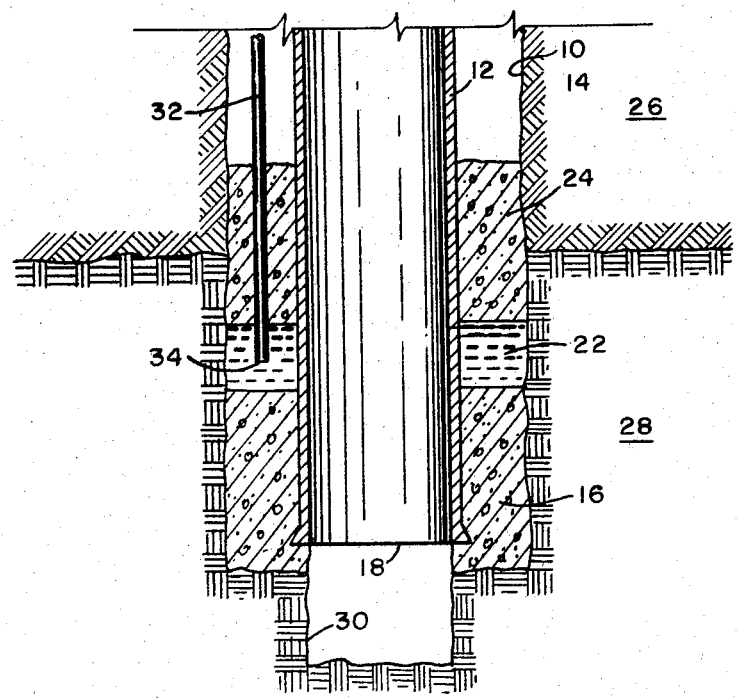
FIGURE 2 is a cross-sectional view, as shown in FIGURE 1, showing a method of maintaining the pressure of a seal and for replenishing the sealing medium.

Another and important part of this invention is the improvement illustrated in FIGURE 2. The arrangement is the same as previously described with reference to FIGURE 1, with the important addition of a small diameter tubing string 32 positioned in annulus 14, having the lower end 34 thereof communicating with the liquid sealing compound 22, and having the upper end in communication with the earth's surface. By this arrangement the pressure of the liquid sealing compound 22 can be continuously maintained by a pressure source at the earth's surface. Any loss of the liquid sealing compound 22 can be replaced by pumping additional sealing compound down the tubing 32.

FIGURE 2 provides a seal for a casing which is completely controllable after installation.

Figure 3:
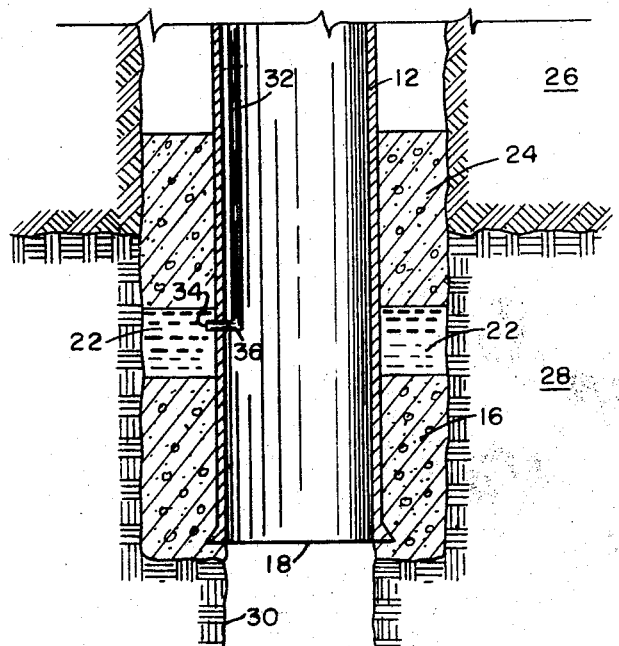
FIGURE 3 is a cross-sectional view, as shown in FIGURE 2, showing an alternate method of maintaining the pressure of the sealing medium.

A variation of the arrangement of FIGURE 2 is shown in FIGURE 3 wherein the casing 12 has an opening therein communicating with the liquid sealing compound 22. In this arrangement the tubing 32 extending to the earth's surface is placed within the casing 12 and sealably through opening 36 so that the lower end 34 communicates with the liquid sealing compound 22.

Figure 4:
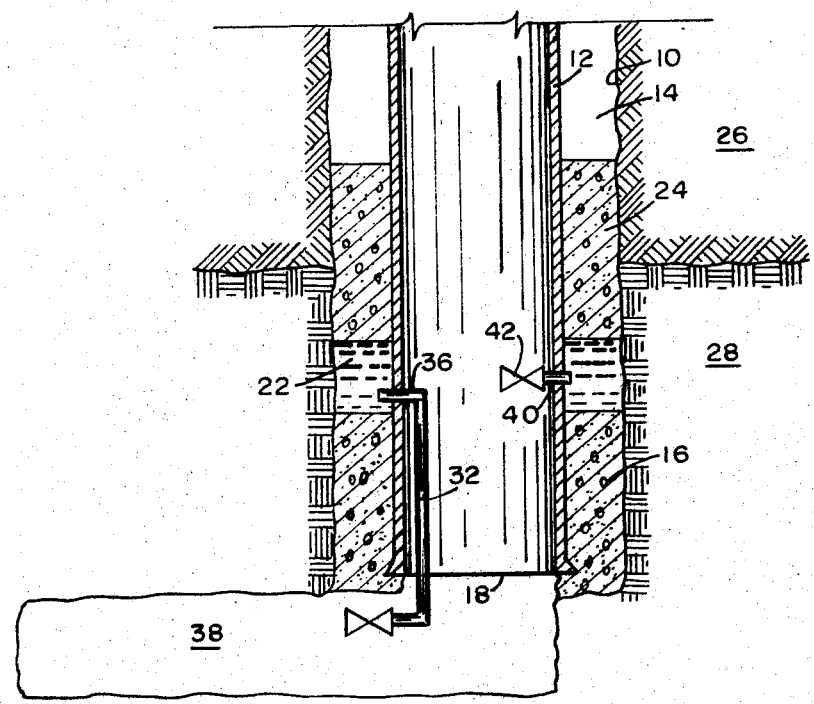
FIGURE 4 is a cross-sectional view, as shown in the other views, but showing the arrangement wherein the bore hole at the lower end thereof communicates with an underground cavern and showing an alternate means of maintaining pressure and for replenishing the sealing medium.

An additional alternate arrangement is shown in FIGURE 4. The bore hole at the lower end of casing 12 communicates with an underground cavern 38. The tubing 32 extends from within the cavern 38 to communication with the liquid sealing compound 22. In this manner the equipment utilized to maintain the pressure and to replenish any loss of the chemical seal can be positioned within the cavern 38. In FIGURE 4 an additional opening 40 is provided in the casing 12 communicating with the liquid sealing compound 22 and provides a means whereby a gage, valve or other device 42 may be attached. A gage may be utilized to monitor the pressure of liquid sealing compound 22 so that it can be ascertained that the pressure is sufficient to prevent possibility of leakage.

The second stratum of cement 24 is shown in the drawings to be of a relative short vertical height. This is variable. In some instances the second stratum 24 will extend upwardly to the earth's surface. The thickness of the various stratum will be determined from conditions such as the depth of the seal, the hydrostatic pressure of water which must be sealed against the diameter of the casing, the permeability of the impervious formation, and so forth.

While the invention has been described with a certain degree of particularity, it is manifest that many changes may be made in the details of construction and arrangement of components without departing from the spirit and scope of the disclosure.

What is claimed is:
1. A method of sealing a casing in an earth bore hole comprising:
    positioning a first circumferential stratum of cement in the annulus between the exterior of the casing and the bore hole;
    positioning a circumferential stratum of liquid sealing compound in the annulus above the first cement stratum;
    positioning a second circumferential stratum of cement above the stratum of liquid sealing compound, the sealing compound remaining in liquid state after being positioned in the annulus; and
    supplying additional sealing compound to said stratum after said cement is set to maintain said stratum at a preselected pressure.
2. A method of sealing a casing in an earth bore hole comprising:
    positioning a first circumferential stratum of cement in the annulus between the exterior of the casing and the bore hole;
    positioning a circumferential stratum of water expandable liquid sealing compound in the annulus above the first cement stratum; and
    positioning a second circumferential stratum of cement above the stratum of liquid sealing compound, the sealing compound remaining in liquid state after being positioned in the annulus.
3. With a casing positioned in the earth bore hole, a sealing means comprising:
    a first circumferential stratum of cement filling the annulus a preselected height between the exterior of the casing and the bore hole;
    a circumferential stratum of water expandable liquid sealing compound filling the annulus a preselected height above said first stratum of cement; and
    a second circumferential stratum of cement filling the annulus a preselected height above said stratum of liquid sealing compound, the sealing compound remaining in liquid form after placing in the annulus.
4. With a casing positioned in an earth bore hole, a sealing means comprising:
    a first cricumferential stratum of cement filling the annulus a preselected height between the exterior of the casing and the bore hole;
    a circumferential stratum of liquid sealing compound filling the annulus a preselected height above said first stratum of cement;
    a second circumferential stratum of cement filling the annulus a preselected height above said stratum of liquid sealing compound, the sealing compound remaining in liquid form after placing in the annulus; and
    a small diameter tubing in the annulus between the exterior of the casing and the bore hole, the lower end of the tubing communicating with the said liquid sealing compound and the upper end of the tubing communicating with the earth's surface and communicating with means for adding additional liquid sealing compound as required.
5. With a casing positioned in an earth bore hole, a sealing means comprising:
    a first circumferential stratum of cement filling the annulus a preselected height between the exterior of the casing and the bore hole;
    a circumferential stratum of liquid sealing compound filling the annulus a preselected height above said first stratum of cement;
    a second circumferential stratum of cement filling the annulus a preselected height above said stratum of liquid sealing compound, the sealing compound remaining in liquid form after placing in the annulus; and
    means communicating with the said stratum of liquid sealing compound and including a tubing positioned internally of said casing having the lower end thereof extending sealably through said opening in said casing and the upper end communicating with the earth's surface and communicating with means for adding additional liquid sealing compound as required.

6. With a casing positioned in an earth bore hole and wherein said hole communicates at the lower end thereof with a cavern, a sealing means comprising:

a first circumferential stratum of cement filling the annulus a preselected height between the exterior of the casing and the bore hole;

a circumferential stratum of liquid sealing compound filling the annulus a preselected height above said first stratum of cement;

a second circumferential stratum of cement filling the annulus a preselected height above said stratum of liquid sealing compound, the sealing compound remaining in liquid form after placing in the annulus; and means communicating with said stratum of liquid sealing compound and including a tubing within said casing sealably communicating at the upper end thereof through said opening in said casing with said stratum of liquid sealing compound and the lower end thereof communicating with said cavern and communicating with means for adding additional liquid sealing compound as required.

7. With a casing positioned in an earth bore hole, a sealing means comprising:

a first circumferential stratum of cement filling the annulus a preselected height between the exterior of the casing and the bore hole;

a circumferential stratum of liquid sealing compound filling the annulus a preselected height above said first stratum of cement;

a second circumferential stratum of cement filling the annulus a preselected height above said stratum of liquid sealing compound, the sealing compound remaining in liquid form after placing in the annulus; and means to maintain the stratum of liquid sealing compound at a preselected pressure.

References Cited

UNITED STATES PATENTS

| | | | |
|---|---|---|---|
| 1,317,462 | 9/1919 | Swan | 166—33 |
| 2,065,512 | 12/1936 | Cannon | 166—32 |
| 2,196,652 | 4/1940 | Baker | 166—26 X |
| 2,236,987 | 4/1941 | Bechtold | 166—29 X |
| 2,842,205 | 7/1958 | Allen et al. | 166—29 X |
| 3,159,976 | 12/1964 | Brandt et al. | 166—32 X |
| 3,161,235 | 12/1964 | Carr | 166—29 |
| 3,245,468 | 4/1966 | Huitt et al. | 166—21 |
| 3,289,762 | 12/1966 | Schell et al. | 166—35 |
| 3,130,783 | 4/1964 | Orr | 166—26 |

CHARLES E. O'CONNELL, Primary Examiner

IAN A. CALVERT, Assistant Examiner

U.S. Cl. X.R.

166—100, 294